United States Patent [19]

Raines et al.

[11] Patent Number: 5,017,630

[45] Date of Patent: May 21, 1991

[54] FREE FLOWING PARTICLES OF AN EMULSION POLYMER HAVING SIO₂ INCORPORATED THEREIN

[75] Inventors: Charles C. Raines, Katy, Tex.; Philip H. Starmer, Avon Lake, Ohio

[73] Assignee: Zeon Chemicals USA, Inc., Avon Lake, Ohio

[21] Appl. No.: 394,992

[22] Filed: Aug. 17, 1989

[51] Int. Cl.⁵ .................................................. C08K 3/00
[52] U.S. Cl. .................................. 523/334; 523/342; 524/555; 524/556; 524/566; 524/574
[58] Field of Search ............... 524/261, 556, 555, 574, 524/493, 566; 523/334, 342

[56] References Cited

U.S. PATENT DOCUMENTS

| | | | |
|---|---|---|---|
| 3,194,781 | 6/1960 | Hedberg et al. | 523/334 |
| 3,894,363 | 11/1974 | Maass et al. | |
| 3,985,703 | 10/1976 | Ferry et al. | 523/342 |
| 3,985,704 | 10/1976 | Jones et al. | 523/342 |
| 4,212,918 | 7/1980 | Marquisee | |
| 4,632,918 | 12/1982 | Eshbach et al. | 524/574 |
| 4,757,101 | 7/1988 | Kleinert et al. | |
| 4,771,092 | 9/1988 | Ollenik et al. | |
| 4,883,829 | 11/1989 | Smigerski et al. | 523/334 |

FOREIGN PATENT DOCUMENTS 3606742 9/1987 Fed. Rep. of Germany .
3628120 2/1988 Fed. Rep. of Germany .

*Primary Examiner*—Joseph L. Schofer
*Assistant Examiner*—Mark Sweet
*Attorney, Agent, or Firm*—Daniel J. Hudak Co.

[57] ABSTRACT

High amounts of silicon dioxide are readily incorporated into an emulsion polymerized elastomer by mixing an aqueous dispersion of silicon dioxide with a latex of the emulsion polymer and subsequently spray drying the mixture. Free flowing, fine-size (e.g., less than 500 micrometers) particles are produced with generally complete incorporation of silicon dioxide. The presence of the silicon dioxide permits rubbers with low gel and/or low Mooney viscosity to be spray dried whereas previously this could not be accomplished. Compared to conventional means of adding a silica to a bale rubber, the above powdered masterbatch gives shorter mixing times with lower power consumption with improved physical properties, such as tensile strength.

10 Claims, No Drawings

FREE FLOWING PARTICLES OF AN EMULSION POLYMER HAVING SIO₂ INCORPORATED THEREIN

FIELD OF THE INVENTION

The present invention relates to free-flowing particles containing high amounts of silicon dioxide incorporated in a polymer made by emulsion polymerization and to a method of producing such particles by spray drying an aqueous dispersion containing the emulsion polymer and the silicon dioxide.

BACKGROUND

Heretofore, silicon dioxide, that is $SiO_2$, was generally incorporated into a rubber such as styrenebutadiene rubber either by direct mixing of solid silicon dioxide with the rubber polymer as in a Banbury, an internal mixer, etc., or by adding the solid $SiO_2$ to a latex containing styrene-butadiene rubber and coagulating the mixture. However, direct mixing as in a Banbury was generally difficult and required multiple steps to incorporate significant amounts of silicon dioxide. Regardless of the number of steps, complete incorporation was not obtained and dusting was always a serious problem. Moreover, a large continuous mass was obtained and required grinding to achieve particles. Incorporation of amounts of silicon dioxide in excess of 50 percent by weight was generally difficult to achieve. The coagulation method of drying the product utilized a coagulant salt such as sodium chloride, calcium chloride, aluminum sulfate, magnesium sulfate, or a quaternary amine compound, and the like and also resulted in only part of the silicon dioxide being incorporated in the rubber. A further problem of the coagulation method is that the end product is a mass of rubber crumbs and hence must be subjected to a subsequent grinding operation. Regardless of method, fine-sized particles were not obtained.

U.S. Pat. No. 4,771,092 to Ollenik et al relates to a process for the production of free-flowing rubber powders with silicic acid as filler comprising combining a rubber latex with silicic acid filler while stirring in the presence of specific auxiliary agents, adjusting the pH range of the mixture to cause coagulation, and separating and drying the resultant solids wherein the specific auxiliary agents comprise organic surfactants together with colloidal silicic acid.

U.S. Pat. No. 4,757,101 relates to a process for producing a free-flowing silicic acid-filled powdered elastomer wherein the silicic acid has various properties such as (a) $SiO_2$: about 2 to 91.5 percent by weight; (b) metallic oxides: about 0.5 to 3 percent by weight; (c) loss on ignition (DIN 55 921/2 - measured at 100° C.): about 8 to 15 percent by weight; (d) moisture (DIN 53 198 measured at 105° C.): about 8 to 15 percent by weight; (e) surface area of the primary particles according to BET: about 40 to 250 m²/g; (f) dibutyl phthalate absorption (ASTM D 2414-79) based on measured weight: about 170 to 290 percent; (g) linear average of numerical distribution of secondary particles: about 10 to 2,000 nm; (h) linear average of volume distribution of secondary particles: about 3 to 30 um; and (i) proportion of secondary particles with a diameter of less than 1 um: about 0.01 to 5 percent by weight.

U.S. Pat. No. 4,632,958 to Eshbach et al relates to a process for preparing pulverulent nitrile rubber particles which can be utilized to form high tensile strength materials, comprising co-precipitating, via the use of an aluminum cation as a co-precipitating agent, nitrile rubber latex and a silicate from an aqueous suspension wherein the suspension has a temperature within the range of from about 0° C. to about 50° C. and a pH ranging from about 7 to about 10.

U.S. Pat. No. 3,849,363 to Engel et al relates to a homogeneous rubber-silica mixture which is obtained by a common precipitation of a synthetic rubber latex and an alkali metal silicate solution with an acid.

U.S. Pat. No. 4,212,918 to Marquisee relates to a non-tacky elastomeric-shaped object by bringing shaped bodies of a normally tacky, uncured elastomer into contact with an aqueous bath containing a soluble coagulating salt for the latex, and a silicic or aluminic acid polymer, and washing and drying the resulting coated shaped objects.

SUMMARY OF THE INVENTION

An aqueous dispersion of silicon dioxide is mixed with an emulsion latex polymer and subsequently the mixture is spray dried to achieve free-flowing, fine-sized particles of the polymer containing very high amounts of the silicon dioxide therein. In effect, a silicon dioxide-emulsion polymer alloy is produced. The production of the fine-sized particles is achieved by a continuous yet relatively easy process and incorporate high amounts of silicon dioxide, for example up to 1,000 parts by weight per 100 parts by weight of the emulsion latex polymer therein. The particles are of an exceedingly fine size. The use of an aqueous dispersion of generally any emulsion latex whereas previously the spray drying of a neat latex was generally very difficult and often times impossible. Moreover, incorporation of silica permits rubbers with low gel and/or low Mooney viscosity to be spray dried whereas previously such could not be accomplished. Generally, any emulsion latex polymer can be utilized with nitrile rubber being preferred.

DETAILED DESCRIPTION OF THE INVENTION

According to the concepts of the present invention, solid silicon dioxide, i.e., $SiO_2$ (non-hydrated), is incorporated into a polymer produced by emulsion polymerization. That is, the silicon dioxide is physically located within as well as on the surface of the polymer and is bonded thereto. In essence, a consolidated particle is formed from the silicon dioxide and the polymer. The silicon dioxide exists in discreet and minute sizes as from about 0.5 to about 50 nanometers, desirably from about 3 to about 30 nanometers, and preferably from about 5 to about 20 nanometers. The silicon dioxide can be any type known to the art or to the literature such as fumed, precipitated, ground, or the like. According to the present invention, it is an important aspect that the silicon dioxide be added to the polymer emulsion in an aqueous form. That is, the silicon dioxide exists as an aqueous dispersion but is not reacted therewith. A suitable commercial source of such an aqueous dispersion containing silicon dioxide is Cab-O-Sperse which is available from Cabot Corporation of Tuscola, Ill.

It is desirable to stabilize the aqueous silicon dioxide as by utilizing small amounts, for example about one to about ten parts by weight of aqueous hydroxides, for example ammonium, sodium, or potassium hydroxide. The stoichiometric amount of the aqueous hydroxide stabilizer per hundred parts by weight of filler which is sufficient to neutralize the hydroxyl groups located on the surface of the silicon dioxide particles can often be calculated by the formula:

$$x = \frac{100 \times E_H}{E_S}$$

where
$E_H$=equivalent weight of the hydroxide, and
$E_S$=surface equivalent weight of the filler.
From P. H. Starmer, "EFfect of Metal Oxides on the Properties of Carboxyl Nitrile Vulcanisates," *Plastics & Rubber Processing & Applications*, 9, (1988), 209-214, $$E_S = \frac{N}{a \times s}$$

where N=Avogadros number; a=number of active sites per square nanometer; and s=surface area per gram in square nanometer.

For example, for fumed silica,
a=2.19 from MP Wagner, Rubber Chem. Technol., 49, (3), 703-774, 1976,
s=1.87×10$^{20}$, from trade literature,
so
$E_S$=1471 with sodium hydroxide $E_H$=40
thus
x=2.7.

In actual practice, amounts either larger or smaller than the stoichiometric level are used for technological or economic reasons.

Alternately, dispersing agents, such as condensed naphthalene sulfonates, can be used.

Generally, any polymer produced by emulsion polymerization can be utilized and hereinafter will be referred to as an emulsion polymer. Specific examples of such types of emulsion polymers are well known to those skilled in the art as well as to the literature. Examples of specific types of emulsion polymers include natural rubber; polymers made from one or more conjugated dienes having from 4 to 12 carbon atoms, preferably from 4 to 6 carbon atoms such as butadiene, isoprene, etc.; polymers made from a conjugated diene having from 4 to 12 carbon atoms with a vinyl substituted aromatic having from 8 to 12 carbon atoms such as styrene, alpha-methyl styrene, vinylpyridine, and the like; polymers and copolymers made from chloroprene (that is polychloroprene); various halogen-containing polymers such as copolymers of vinylidene fluoride and hexafluoropropylene; acrylic rubbers including polymers and copolymers of alkyl acrylates; various nitrile rubbers; and combinations thereof.

An important class of an emulsion latex polymer which can be utilized in the present invention are the various acrylate rubbers and such are well known to the art and to the literature. The acrylate rubber contains from about 80 to about 99.9 percent by weight, desirably from about 90 to about 99.9 percent by weight, and preferably from about 95 to about 99.9 percent by weight based upon the weight of the polymer, of an acrylate unit made from a monomer of the formula

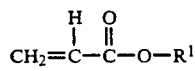

wherein R$^1$ is an alkyl radical containing 1 to 18 carbon atoms, an alkoxyalkyl or alkylthioalkyl radical containing a total of 2 to about 12 carbon atoms, or a cyanoalkyl radical containing 2 to about 12 carbon atoms. The alkyl structure can contain primary, secondary, or tertiary carbon configurations. Examples of such acrylates are methyl acrylate, ethyl acrylate, propyl acrylate, n-butyl acrylate, isobutyl acrylate, n-pentyl acrylate, isoamyl acrylate, n-hexyl acrylate, 2-methylpentyl acrylate, n-octyl acrylate, 2-ethylhexyl acrylate, n-decyl acrylate, n-dodecyl acrylate, n-octadecyl acrylate, and the like; methoxymethyl acrylate, methoxyethyl acrylate, ethoxyethyl acrylate, butoxyethyl acrylate, ethoxypropyl acrylate, methylthioethylacrylate, hexylthioethylacrylate, and the like; and alpha and betacyanoethyl acrylate, alpha, beta and gamma-cyanopropyl acrylate, cyanobutyl acrylate, cyanohexyl acrylate, cyanooctyl acrylate, and the like. Often mixes of two or more monomers and/or types of acrylate monomers are employed in any proportion, for example, an alkyl acrylate monomer and an alkoxyalkyl acrylate monomer.

Although the acrylate rubber can be made solely from an acrylate monomer, desirably it is made with a small amount of a comonomer.

One suitable type of comonomer is an active halogen-containing monomer. The amount of the comonomer generally utilized is from about 0.1 to about 20 percent by weight, desirably from about 0.1 to about 10 percent by weight, and preferably from about 0.1 to about 5 percent by weight based upon the total weight of the one or more acrylate monomers and one or more active halogencontaining monomers. The halogen groups can be chlorine, bromine, or iodine. These monomers are of two main types, halogen-containing vinylene hydrocarbons and halogen-containing vinyl monomers having the halogen group at least two carbon atoms removed from an oxygen atom(s). Examples of halogen-containing vinylene hydrocarbons are vinyl benzyl chloride, vinyl benzyl bromide, 5-chloromethyl-2-norbornene, 5-bromomethyl-2-norbornene, 5-beta-chloroethyl-2-norbornene, and the like. The second type of monomer, i.e., those having the halogen group at least two carbon atoms removed from an oxygen atom are characterized by having either (-O-), ketone

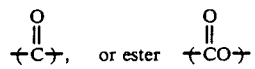

structures in the monomer where the halogen group is at least 2 carbon atoms and up to 6 or more carbon atoms removed from an oxygen atom. Examples of these monomers are halogen-containing vinyl esters such as vinyl chloroacetate, vinyl bromoacetate, allyl chloroacetate, vinyl 3-chloropropionate, vinyl 4-chlorobutyrate, vinyl 4-bromobutyrate, and the like; halogen-containing acrylates such as 2-chloroethyl acrylate, 3-chloropropyl acrylate, 4-chlorobutyl acrylate, 2-chloroethyl methacrylate, 2-bromoethyl acrylate, 2-iodoethyl acrylate, 4-chloro-2-butenyl acrylate, 2-chloroacetoxyethyl acrylate and methacrylate, and the like; halogen-containing vinyl ethers such as 2-chloroethyl vinyl ether; halogen-containing vinyl ketones such as chloromethyl vinylketone, 2-chloroethyl vinyl ketone, and the like; and 5-chloroacetoxymethyl-2-norbornene, 5-(alpha,beta-dichloropropionylmethyl)-2-norbornene, and the like. Due to availability and cost, the chlorine-containing monomers are preferred. Examples of the more preferred monomers are vinyl chloroacetate, allyl chloroacetate, 2-chloroethyl acrylate, 3-chloropropyl acrylate, 4-chloro-2-butenyl acrylate and methacrylate, 2-chloroethyl methacrylate, chloromethyl vinyl ketone, vinyl benzyl chloride, 5-chloromethyl-2-norbornene, 2-chloroacetoxyethyl acrylate and methacrylate, and 5-chloroacetoxymethyl-2-norbornene. Non-halogen cure site monomers can also be used but generally are not desirable such as epoxy, e.g. allylglycidyl ether, glycidyl methacrylate.

A preferred emulsion polymer is a nitrile rubber as in the form of an emulsion latex. Nitrile rubbers are well known to the art and to the literature and are generally made from one or more monomers of acrylonitrile or an alkyl derivative thereof with one or more conjugated dienes and optionally one or more monomers of acrylic acid or an ester thereof, or a dicarboxylic acid. Examples of acrylonitrile monomers or alkyl derivatives thereof include acrylonitrile and alkyl derivatives thereof having from 1 to 4 carbon atoms such as methacrylonitrile, methylene glutaronitrile, and the like. The amount of the acrylonitrile or alkyl derivative monomers is from about 0 or 1 percent to about 50 percent by weight and preferably from about 25 percent to about 45 percent by weight based upon the total weight of the nitrile rubber forming monomers. That is, although an acrylonitrile or monomer or derivative thereof is generally utilized, it need not always be utilized as known to those skilled in the art. The conjugated diene monomers generally have from 4 to 10 carbon atoms with from 4 to 6 carbon atoms being preferred. Examples of specific conjugated diene monomers include butadiene, isoprene, hexadiene, and the like. The amount of such conjugated dienes is generally from about 50 percent to about 99 percent by weight and preferably from about 55 percent to about 75 percent by weight based upon the total weight of the nitrile rubber forming monomers.

The nitrile rubbers of the present invention can also contain various optional comonomers as known to those skilled in the art as well as to the literature. Such optional comonomers generally include acrylic acid or various esters thereof, dicarboxylic acids, or combinations thereof. The acrylic acid or the esters thereof can generally be represented by the formula

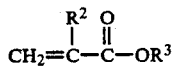

where $R^2$ is hydrogen or an alkyl having from 1 to 4 carbon atoms, and wherein $R^3$ is hydrogen, or (a) a nitrile containing ester wherein the ester portion contains a total of from 1 to 8 carbon atoms, (b) a hydroxyl containing ester wherein the ester portion contains a total of from 1 to 8 carbon atoms, (c) an unsaturated epoxy containing monomer which contains a total of from 3 to 12 carbon atoms, (d) unsaturated halogen containing polymers, for example, vinyl benzyl chloride, (e) unsaturated amine containing monomers, for example dimethylaminoethyl methacrylate, (f) or combinations thereof. When $R^3$ is hydrogen, examples of suitable acids include acrylic acid, methacrylic acid, and the like. When $R^3$ is a nitrile containing ester, examples of suitable optional monomers include cyanoethyl acrylate, cyanoethyl methacrylate, cyanobutyl ether acrylates, and the like. Examples of suitable hydroxyl containing esters include hydroxy ethyl methacrylate, hydroxy propyl methacrylate, hydroxy ethyl acrylate, and the like. Examples of suitable epoxy containing monomers include glycidyl methacrylate, glycidyl acrylate, allyl glycidyl ether, and the like. The dicarboxylic acids generally contain from 3 to about 10 carbon atoms and specific examples include maleic acid, fumaric acid, itaconic acid, and the like.

When utilized in forming the nitrile rubber, the amount of the above-noted optional monomers is generally from about 0.1 to about 25 percent by weight and preferably from about 4 to about 12 percent by weight based upon the total weight of the nitrile rubber forming monomers. As noted hereinabove, although generally utilized, an acrylonitrile monomer or an alkyl derivative thereof need not always be utilized in association with the conjugated diene monomers. In such an event, one or more of the above-noted optional monomers are utilized.

The various emulsion polymers including the various acrylic rubbers and the various nitrile rubbers are made in any conventional manner as well known to those skilled in the art as well as to the literature. That is, the various monomers which form an emulsion polymer can be added to suitable amounts of water in a polymerization vessel along with one or more conventional ingredients and polymerized. Polymerization is generally initiated by various conventional catalysts such as freeradical catalysts, especially with nitrile rubber, such as various organic peroxides and hydroperoxides, e.g., benzoyl peroxide, dicumyl peroxide, cumene hydroperoxide, and the like, either alone or with Redox systems; diazo compounds such as azobisisobutyronitrile, and the like; persulfate salts such as sodium, potassium, and ammonium persulfate, used alone or with redox systems; and the use of ultraviolet light with photo-sensitive agents such as benzophenone, triphenylphosphine, organic diazos, and the like.

Inasmuch as the polymers are prepared via an emulsion latex polymerization route, various conventional primary emulsifying aids can be utilized which are well known to the art and to the literature. Generally, any suitable surfactant can be utilized such as anionic or nonionic as set forth in McCutcheons, "Detergents and Emulsifiers," 1978, North American Edition, Published by McCutcheon's Division, MC Publishing Corp., Glen Rock, N.J., U.S.A., as well as the various subsequent editions thereof, all of which are hereby fully incorporated by reference. Desirably, various conventional anionic soaps or detergents are utilized such as a sodium alkyl sulfate, wherein the alkyl has from 8 to 22 carbon atoms such as sodium lauryl sulfate, sodium stearyl sulfate, and the like, as well as various sodium alkyl benzene sulfonates, wherein the alkyl has from 8 to 22 carbon atoms such as sodium dodecyl benzene sulfonate, and the like. Other anionic surfactants include sulfosuccinates and disulfonated alkyl benzene derivatives having a total of from 8 to 22 carbon atoms. Various phenyl type phosphates can also be utilized. Yet other anionic surfactants include various fatty acid salts having from 12 to 22 carbon atoms as well as various rosin acid salts wherein the salt portion is generally lithium, sodium, potassium, ammonium, and the like. The selection of the surfactant generally depends on the pH of the polymerization action. Hence, fatty acid salts and rosin acid salts are not utilized at low pH values.

The amount of the surfactant can vary depending upon the size of emulsion polymer particles desired, but typically is from about 1 percent to about 6 percent and desirably from about 2 percent to about 3 percent by weight for every 100 parts by weight of the emulsion polymer forming monomers.

Other secondary emulsifying aids are utilized such as various secondary emulsifiers which control particle size by controlling the solubility of the soap. Examples of various conventional secondary emulsifiers generally include sodium, potassium, or ammonium naphthalene sulfonates. The amount of such secondary emulsifiers is from about 0.01 to about 1.0 parts by weight for every 100 parts by weight of the emulsion polymer. Electrolytes can also be used and include sodium sulfate, sodium carbonate, sodium chloride, potassium carbonate, and the like. The amount of electrolyte is generally from about 0.1 to about 1.0 parts by weight with from about 0.2 to about 0.5 parts by weight for every 100 parts by weight of the emulsion polymer (i.e. nitrile rubber) forming monomers.

Molecular weight modifiers are also utilized to maintain the molecular weight within desirable limits as otherwise the viscosity of the polymer would be exceedingly high for subsequent handling, processing, and the like. Generally, known conventional molecular weight modifiers can be utilized such as various mercaptans which have from about 8 to about 22 carbon atoms, generally in the form of an alkyl group. Various sulfide compounds can also be utilized such as diisopropylxanthogendisulfide and di-sec-butylxanthogendisulfide. The amount of the molecular modifiers is generally an effective amount such that the Mooney viscosity, that is ML-4' @100° C. is from about 10 to about 120 and desirably from about 20 to about 80.

Other conventional emulsion latex additives can also be utilized such as various conventional short-stop agents, various antioxidants, and the like, all in conventional amounts. Examples of various antioxidants include the various phenolic type antioxidants such as ditertbutylparacresol, various diphenylamine antioxidants such as octylated diphenylamine, various phosphite antioxidants such as trisnonyl phenyl phosphite, and the like. The amount of antioxidant is generally from about 0.1 to about 5 parts by weight and preferably from about 0.5 to about 1 part by weight for every 100 parts by weight of the emulsion polymer.

The conversion amounts of the various abovenoted emulsion latex polymers can vary greatly but typically is less than 95 percent and preferably from about 80 to about 90 percent for easy processing. If desired, crosslinking can occur either during or after polymerization to obtain a high gel content material.

According to the present invention, the aqueous dispersed silicon dioxide and the emulsion latex polymer are added to one another, in any order, and mixed to form an admixture. Thus, an aqueous solution is produced containing the emulsion polymer and the suspended silicon dioxide. It has been surprisingly found that when the above binary type solution is dried according to a specific type of process, very high amounts and generally all of the silicon dioxide are incorporated within the emulsion polymer. That is very little, if any, free silicon dioxide solid not bound or attached to any emulsion polymer exists.

The method of drying involves spray drying the aqueous binary solution. That is, the binary solution is fed through a dispersion apparatus which sprays the solution into a heated atmosphere as in a cyclone. Generally, any type of spray drying apparatus can be utilized as known to those skilled in the art as well as to the literature. In the spray drying operation, the feed material is sprayed into a large chamber into which hot air is generally introduced. The liquid in the spray is rapidly evaporated leaving solid particles which must then be separated from the air. The motion of the air, or other gas, and material or particle are more or less co-current. Spray dryers generally comprise the following essential parts: a drying chamber, a means for spraying the feed material or latex into the drying chamber, means for introducing hot air into the drying chamber, means for removing the air from the drying chamber at a point normally remote from the entry of the latex feed as well as the hot air, and means for separating the product from the egressing air. Stated differently, spray drying involves fundamental unit processes of liquid atomization, gas-droplet mixing, and drying the liquid droplets. The means for feeding the binary solution, that is the aqueous silicon dioxide and the emulsion latex polymer, can be by utilizing a nozzle in which the binary solution is forced under pressure through small holes; nozzles in which spray is generated by action of a secondary fluid such as compressed air, or spinning or rotating disks. Numerous types of spray dryers can be utilized such as those described in *Chemical Engineers' Handbook*, Fifth Edition, Chilton and Perry, Section 20, 55–63, 1973, and *Drying of Solids in the Chemical Industry*, Nonhebel and Moss, pages 253–263, 1971, which are hereby fully incorporated by reference. Naturally, the amount of hot inlet air and temperature thereof, and the like, is sufficient to adequately dry the binary solution and produce free-flowing particles. Generally, the temperature, the air velocity, the free fall time of the various droplet particles, the time required for drying, and the like are sufficient such that a dried, consolidated particle is produced. For example, the inlet air temperature can be from about 100° C. to about 250° C., desirably from about 130° C. to about 200° C., and the outlet air temperature is cooler, for example, as from about 80° C. to about 130° C. It should be apparent to one skilled in the art that the various above-noted factors such as temperature, air flow, etc., can be readily varied to produce dried, consolidated particles. Naturally, the temperature should not be so high as to burn or degrade the material, and the like. Examples of suitable spray drying apparatus include Bowen, Niro, Swenson, and the like.

It is to be understood that spray drying apparatus does not include coagulation techniques nor of mastication type techniques wherein the silicon dioxide, generally in the form of a dry solid or powder, is added directly to a dried emulsion polymer and mixed therein as in a Banbury. The spray drying operation has surprisingly been found to produce free-flowing particles, that is consolidated particles containing silicon dioxide and an emulsion polymer. Although of a fine-size, the consolidated particles contain nearly all and generally completely all of the silicon dioxide therein which was admitted to the spray dryer via the binary aqueous solution. That is, the amount of incorporated silicon dioxide is generally at least 80 or 90 percent, desirably at least 95 percent, more desirably 98 or 99 percent, and preferably 100 percent by weight of the initial amount added to the dryer. Hence, the spray drying process of the present invention essentially amounts to a dust-free silicon dioxide process and problems with regard to recovery of the non-incorporated silicon dioxide are generally eliminated. Such an aspect was generally unexpected in that the various processes utilized heretofore to incorporate silicon dioxide within a latex polymer such as coagulation, etc., have always resulted in the loss of a substantial portion of the silicon dioxide The individual particle size which can be controlled by either equipment variables, for example, inlet and outlet temperatures or feed variables, for example surface tension and viscosity, is generally from about 1 to about 500 microns, desirably from about 3 to about 250 microns, and preferably from about 5 to about 100 microns in diameter. Although a plurality of individual particles may agglomerate due to static cling, the size of the individual particles is quite small as indicated. So effective is the spray drying system that substantial amounts, i.e., a major component by weight of the particle can be silicon dioxide. The bulk density of the various particles will vary depending upon the weight ratio of the silicon dioxide in the aqueous dispersion to the emulsion polymer in the latex. However, a bulk density of generally at least 10 lbs/cu.ft. and preferably at least 15 lbs/cu.ft. or greater is obtained when the weight ratio is approximately 35 to 100 phr. Such bulk densities generally could only be obtained prior to this invention through direct blending of powder $SiO_2$, as in a Banbury or mill which is time consuming and requires extra power, or by coagulation which is not efficient. Another advantage of the spray drying mechanism of the present invention is that the particles yield a powder which is free flowing and can be readily utilized in bulk handling processing equipment. Transportation, storage, unloading, and the like of the consolidated particles are thus readily achieved.

According to the present invention, very high amounts of a non-hydrated silicon dioxide can be incorporated into the emulsion polymer. For example, from about 20 to about 1,000. or from about 30 to about 700 parts by weight for every 100 parts by weight of emulsion polymer. Depending upon whether a low loading is desired, a desired amount of silicon dioxide can be from about 35 to about 100 parts by weight or, if a high loading is desired, from about 300 parts to about 700 parts by weight for every 100 parts by weight of the emulsion polymer or rubber in the consolidated particle. Naturally, it is to be understood that different amounts can also be utilized.

It has been found that due to the processing techniques of the present invention, the silicon dioxide is unexpectedly better dispersed within the emulsion polymer and that unexpected and improved physical properties such as tensile strength are obtained as compared to a direct mixing method such as where a solid silicon dioxide powder is added and blended with the emulsion polymer as in a Banbury.

The consolidated particles of the present invention can be utilized in many applications including sulfur or peroxide vulcanized elastomeric articles which require properties, such as high tear resistance, obtained from fine particle silicon dioxide fillers. The polymers for this application should have a Tg below room temperature, i.e. 20° C., desirably below 10° C., and preferably below minus 20° C. Another advantage is that the consolidated particles can be utilized in a rubber masterbatch wherein the rubber constitutes a minor component and the consolidated particles containing silicon dioxide constitute a major component.

The consolidated particles of the present invention can generally be utilized for specific end uses for which the emulsion latex polymer is utilized. For example, where the emulsion polymer is a nitrile rubber, the consolidated particles of the present invention can be utilized for various molded, extruded, or calendered goods, with specific examples including gaskets, non-black printing rolls, milking inflations, shoe soles, spinning cots, and the like.

The invention will be better understood by reference to the following examples.

EXAMPLE 1

An identical latex solution containing 1) Hycar 1052 latex, a nitrile rubber latex having a Mooney viscosity of from about 45 to about 60 and 2) Cab-O-Sperse 83, was A) coagulated with calcium chloride according to a standard prior art coagulation technique as well as B) spray dried in a Niro spray dryer in accordance with the present invention. The results of silicon dioxide incorporation in terms of ash content are set forth in Table I.

TABLE I

|  | Parts Dry Weight |
|---|---|
| Hycar 1052 Latex | 100 |
| Cab-O-Sperse 83 | 50 |

|  | Theoretical | Coagulation with CaCl$_2$ | Spray Drying |
|---|---|---|---|
| Ash % | 33.9* | 24.4 | 33.7 |
| Physical Form |  | crumb | powder |

*includes non-volatiles in latex of around 0.6 percent.

Coagulation—one volume of latex blend (i.e., one gallon) was slowly added, with agitation, to three volumes (i.e., three gallons) of a hot (50 to 60° C.) aqueous solution of 2 percent calcium chloride. When all the latex was coagulated, the coagulum was strained through cheesecloth. This coagulum was subsequently washed by adding to three volumes of hot (50 to 60° C.) water nd agitating for a period of 10 to 30 minutes. This was repeated twice. After the third wash, the coagulum was placed on trays and dried in an oven at 105° C.

Spray drying—latex blend fed to Niro spray dryer inlet temperature 150° C.

As apparent from Table I, essentially all of the silicon dioxide was incorporated into the emulsion polymer by the spray dried method of the present invention whereas only about 72 percent by weight of the silicon dioxide was incorporated by the prior art coagulation method.

EXAMPLE 2

Another nitrile rubber latex was mixed with an aqueous silicon dioxide solution and spray dried. The formulation of the latex solution was as follows:

TABLE II

|  | Parts Dry Weight |
|---|---|
| Hycar VT 380 Latex[1] | 100 |
| Dresinate 731[2] | 1 |
| Cab-O-Sperse 83[3] | 35 |

The above ingredients were mixed together with agitation, the extra soap (Dresinate) being added to improve the latex stability. The resulting blend was then fed to a Niro spray dryer under the following conditions:

| Inlet temperature | 180° C. |
|---|---|
| Outlet temperature | 80° C. |

After spray drying, two parts Cab-O-Sil silica per hundred parts of product were added by a screw feeder to reduce the tendency to agglomerate. The properties obtained were as follows:

| | |
|---|---|
| Ash content % | 26.6 |
| Bulk density lbs/cu. ft | 18.7 |
| Friability rating | 4 |

[1]butadiene-acrylonitrile copolymer with bound acrylonitrile content of 29 to 31 percent and Mooney viscosity at 100° C. of 75 to 85 - B F Goodrich, Elastomers and Latex Division
[2]sodium salt of rosin acid - Hercules
[3]aqueous dispersion of nonhydrated silica - Cabot Corporation Table II shows that once again a very high incorporation of the silicon dioxide particles was obtained as evident by the ash content percent and that a very high bulk density was also obtained.

EXAMPLE 3

The spray dried blend of Example 2 (Table II) was compound and compared with a neat control. The compounding recipe is set forth in Table III(A)

TABLE III(A)

| | RECIPES | |
|---|---|---|
| | 1 (control) | 2 (Example 2 Master Batch) |
| Cab-O-Sperse Blend | — | 135.0 |
| Hycar VT 380[1] | 100.00 | — |
| Cab-O-Sil M5 | 35.00 | — |
| Zinc Oxide | 5.00 | 5.00 |
| Dioctyl Phthalate | 10.00 | 10.00 |
| Stearic Acid | 1.00 | 1.00 |
| Spider Sulfur | 1.50 | 1.50 |
| Stalite[3] | 1.5 | 1.5 |
| MBTS[4] | 0.5 | 0.5 |
| TOTAL | 155.5 | 155.5 |

[1]butadiene-acrylonitrile copolymer with bound acrylonitrile content of 29 to 31 percent and Mooney viscosity at 100° C. of 75 to 85 - B F Goodrich, Elastomers and Latex Division
[2]nonhydrated silica - Cabot Corporation
[3]mixture of alkylated diphenylamines - R T Vanderbilt Company
[4]benzothiazyl disulfide - various Recipes 1 and 2 were subjected to the following mixing procedure:

TABLE III(B)

Mixing Procedure
B R Banbury, 77 rpm, full cooling

Recipe 1
0 min. add polymer, Cab-O-Sil, SI-69 after above incorporated, mix 1 min. 1+ min. add other ingredients. When mixed drop. Do not exceed 140° C. Add cure on mill.
Recipe 2
0 min. add polymer, SI-69. ½ min. add other ingredients. When mixed drop. Do not exceed 140° C. Add cure on mill.

| Mixing Properties | Recipe 1 | Recipe 2 |
|---|---|---|
| Stock temperature °C. | 143 | 157 |
| Power Usage kWH | 0.395 | 0.442 |
| Mix. time min. | 4.5 | 3.0 |
| Mix | POOR | VERY GOOD |

As apparent from Table III(B), poor mixing with the various compounding ingredients was obtained with the neat recipe, i.e., the control, whereas the spray dried recipe (Recipe 2) achieved very good mixing.

Processing properties of Recipes 1 and 2 are set forth in Table III(C).

TABLE III(C)

| Processing Properties | | |
|---|---|---|
| | RECIPES | |
| | 1 | 2 |
| Mooney Viscometer: Large Rotor, 125° C. | | |
| Viscosity Minimum | 51.5 | 95.2 |
| T5, minutes | 35 | 7.6 |
| T35, minutes | 35 | 10.8 |
| Rheometer, Microdie, 100 cpm, 1° ARC 170° C. | | |
| Ml., lbf*in | 8.6 | 17.0 |
| MH, lbf*in | 37.3 | 49.6 |
| Ts1, minutes | 1.1 | 1.0 |
| T'90, minutes | 12.2 | 12.0 |
| Cure Time, minute | 15.0 | 22.0 |

As apparent from Table III(C), the spray dried masterbatch (Recipe 2) achieved a much higher viscosity indicating much better dispersion of the silicon dioxide than the neat control.

Table III(D) sets forth various vulcanized properties.

TABLE III(D)

| Vulcanized Properties | | |
|---|---|---|
| | RECIPES | |
| | 1 | 2 |
| Originals: Cure time 20 min. Cure Temp. 170° C. | | |
| Stress 100%, psi | 200.0 | 225 |
| Stress 200%, psi | 300.0 | 375 |
| Tensile, psi | 2050.0 | 3500 |
| Elongation, % | 740.0 | 680 |
| Hardness, A pts. | 62.0 | 63.0 |

Table III(D) indicates that the spray dried nitrile rubber-silicon dioxide blend of the present invention unexpectedly yields a much higher tensile strength which again is indicative of good dispersion.

EXAMPLE 4

Different elastomers were utilized with an aqueous silica dispersion and mixed and spray dried in a manner as set forth in Examples 1 and 2. The recipe, as well as the various spray dry parameters such as inlet and outlet temperatures, and the like, are set forth in Table IV.

TABLE IV

| Comparison of Different Elastomers | | | | | |
|---|---|---|---|---|---|
| | Parts Dry Weight | | | | |
| Latex | 1 | 2 | 3 | 4 | 5 |
| Poly(Chloroprene)[1] | 100 | | | | |
| Poly(Chloroprene)[2] | | 100 | | | |
| Poly(Chloroprene)[3] | | | 100 | | |
| SBR 1502 | | | | 100 | |
| Acrylic Latex[4] | | | | | 100 |
| Silica Dispersion[5] | 50 | 50 | 50 | 50 | 50 |
| Buchi 190 Mini Spray Dryer Data Sheet Air Temperature deg C. | | | | | |
| Inlet Max | 151 | 151 | 152 | 154 | 152 |
| Inlet Min | 150 | 149 | 150 | 152 | 149 |
| Outlet Max | 98 | 102 | 89 | 63 | 93 |
| Outlet Min | 72 | 69 | 67 | 45 | 76 |
| Latex Feed Rate cc/min | 8.2 | 9.4 | 8.0 | 9.3 | 10.7 |
| Grams Feed, Dry Weight | 180 | 180 | 180 | 115 | 180 |
| Grams Product | | | | | |
| Spray Cylinder | 77 | 54 | 41 | 8 | 79 |
| Separator | 8 | 11 | 51 | 15 | 6 |

TABLE IV-continued
Comparison of Different Elastomers

| | Parts Dry Weight | | | | |
|---|---|---|---|---|---|
| Latex | 1 | 2 | 3 | 4 | 5 |
| Cyclone | 9 | 31 | 10 | 0 | 11 |
| Collector | 79 | 66 | 70 | 79 | 74 |
| Total Product | 173 | 162 | 172 | 102 | 170 |
| Total Usable Product | 162 | 159 | 166 | 96 | 166 |
| Additional Silica | 0 | 0 | 0 | 0 | 2 |
| Ash % | 32.5 | 35.4 | 32.6 | 49.9 | — |
| Bulk Density Lbs/cu ft | 16.2 | 15.0 | 11.2 | 16.2 | — |
| Friability Rating | V | IV | IV | V | — |

[1] Neoprene 400, Manufactured by E. I. Du Pont
[2] Neoprene 735A, Manufactured by E. I. Du Pont
[3] Denka L300, Manufactured by Denka Chemical Corp.
[4] Hytemp 4051, Manufactured by B F Goodrich Company
[5] Cab-O-Sperse 3295, Manufactured by Cabot Corp. (15% silica)

FRIABILITY RATING

I Compacted
II Henschel Friable
III Hand Friable
IV Touch Friable
V Free Flowing As apparent from Table IV, although different types of emulsion polymers were utilized, very high ash content ratings were obtained thereby indicating essentially complete incorporation of the silica.

EXAMPLE 5

Different levels of silica in nitrile rubber were prepared by mixing the amount of silica noted in Table V in a beaker with mild agitation.

TABLE V
EFFECT OF DIFFERENT LEVELS OF SILICA

| | PARTS DRY WEIGHT | | | | | |
|---|---|---|---|---|---|---|
| Latex | 1 | 2 | 3 | 4 | 5 | 6 |
| Cold Nitrile Rubber[1] | 100 | 100 | 100 | 100 | — | — |
| Hot Nitrile Rubber[2] | — | — | — | — | 100 | 100 |
| Silica Dispersion[3] | 300 | 200 | 100 | 50 | 100 | 50 |
| Ash % | 73.2 | 64.1 | 49.4 | 33.7 | 50.3 | 34.26 |
| Bulk Density lb/cu ft | 18.7 | 16.9 | 21.9 | 20.6 | 23.7 | 24.97 |
| Friability Rating (see Table IV) | V | V | V | IV | V | V |

[1] Hycar 1052, Manufactured by B F Goodrich, Mooney viscosity of 40-55. Sample compacted for 7 days at 9.6 gm/sq cm
[2] Hycar 1022, Manufactured by B F Goodrich, Mooney viscosity of 45-60.
[3] Cab-O-Sperse 3295, Manufactured by Cabot Corp. Containing 5 percent of nonhydrated $SiO_2$ by weight therein As apparent from Table V, the incorporation of silica within the nitrile rubber was generally very high, and generally was at least 96 percent by weight.

EXAMPLE 6

Different types of silicas were utilized as set forth in Table VI.

TABLE VI
COMPARISON OF DIFFERENT SILICAS

| | PARTS DRY WEIGHT | | | | |
|---|---|---|---|---|---|
| Latex | 1 | 2 | 3 | 4 | 5 |
| Cold Nitrile Rubber[1] | 100 | 100 | 100 | 100 | 100 |
| Amorphous Silica[2] | 50 | | | | |
| Fumed Silica[3] | | 50 | | | |
| Fumed Silica[4] | | | 50 | | |
| Fumed Silica[5] | | | | 50 | |
| Fumed Silica[6] | | | | | 50 |
| Buchi 190 Mini Spray Dryer Data Sheet | | | | | |
| Air Temperature | | | | | |
| deg C. | | | | | |
| Inlet Max | 150 | 152 | 152 | 153 | 152 |
| Inlet Min | 150 | 150 | 150 | 151 | 151 |
| Outlet Max | 108 | 92 | 88 | 113 | 102 |
| Outlet Min | 87 | 69 | 58 | 68 | 75 |
| Latex Feed Rate cc/min | 8.3 | 9.4 | 7.7 | 7.9 | 9.4 |
| Grams Product | | | | | |
| Spray Cylinder | 23 | 40 | 33 | 37 | 32 |
| Separator | 2 | 4 | 6 | 9 | 5 |
| Cyclone | 6 | 10 | 7 | 5 | 2 |
| Collector | 6 | 22 | 21 | 15 | 11 |
| Total Product | 37 | 76 | 67 | 66 | 50 |
| Total Usable Product | 23 | 68 | 67 | 38 | 30 |
| Ash % | 30.3 | 30.5 | 31.6 | 26.8 | 32.6 |

[1] Hycar 1052, manufactured by B F Goodrich. Mooney viscosity of 40-55.
[2] Hi-Sil 233, manufactured by PPG Industries, containing 30 percent of silica therein and having a nominal particle size of 22 nanometers.
[3] Aerosol K300, manufactured by Degussa, containing 30 percent of silica therein and having a nominal particle size of 7 nanometers.
[4] Cab-O-Sperse S 3295, manufactured by Cabot Corp., containing 15 percent of silica therein and having a nominal particle size of 8 nanometers.
[5] Cab-O-Sperse S 109, manufactured by Cabot Corp., containing 20 percent of silica therein and having a nominal particle size of 30 nanometers.
[6] Cab-O-Sperse P 1010, manufactured by Cabot Corp., containing 30 percent of silica therein and having a nominal particle size of 30 nanometers.

As apparent from Table VI, the amount of incorporation of silicon dioxide was generally always in excess of 96 percent regardless of the type of silica utilized.

While in accordance with the Patent Statutes, the best mode and preferred embodiment has been set forth, the scope of the invention is not limited thereto, but rather by the scope of the attached claims.

What is claimed is:

1. A silicon dioxide-emulsion polymer alloy, comprising:
a free flowing emulsion polymer having nonhydrated silicone dioxide incorporated therein derived from a spray dried aqueous solution containing an admixture of dispersed $SiO_2$ is an emulsion polymer latex and wherein the amount of said non-hydrated silicone dioxide is from about 20 to about 1000 parts by weight per 100 parts by weight of said emulsion polymer.

2. A silicon dioxide-emulsion polymer alloy according to claim 1, wherein the particle size of said nonhydrated $SiO_2$ is from about 0.5 to about 50 nanometers.

3. A silicon dioxide-emulsion polymer alloy according to claim 2, wherein the amount of said silicon dioxide is from about 30 to about 700 parts by weight per 100 parts by weight of said emulsion polymer.

4. A silicon dioxide-emulsion polymer alloy according to claim 3, wherein said emulsion polymer is nitrile rubber, or acrylic rubber, and wherein the particle size of said nonhydrated $SiO_2$ is from about 3 to about 30 nanometers.

5. A silicon dioxide-emulsion polymer alloy according to claim 4, wherein said free-flowing silicon dioxide incorporated emulsion polymer has a glass transition temperature of minus 10° C. or lower, and wherein the particle size of said nonhydrated $SiO_2$ is from about 5 to about 20 nanometers.

6. A silicon dioxide-emulsion polymer alloy according to claim 1, wherein the size of said freeflowing silicon dioxide incorporated emulsion polymer is from about 1 to about 500 microns.

7. A silicon dioxide-emulsion polymer alloy according to claim 4, wherein the size of said freeflowing silicon dioxide incorporated emulsion polymer is from about 5 to about 100 microns.

8. A silicon dioxide-emulsion polymer alloy according to claim 1, wherein the amount of $SiO_2$ incorporated into said emulsion polymer is at least 90 percent by weight of said $SiO_2$ contained in said aqueous $SiO_2$ solution.

9. A silicon dioxide-emulsion polymer alloy according to claim 3, wherein the amount of $SiO_2$ incorporated into said emulsion polymer is at least 95 percent by weight of said $SiO_2$ contained in said aqueous $SiO_2$ solution.

10. A silicon dioxide-emulsion polymer alloy according to claim 5, wherein the amount of $SiO2$ incorporated into said emulsion polymer is at least 98 percent by weight of said $SiO_2$ contained in said aqueous $SiO_2$ solution.

* * * * *